United States Patent [19]

Petrus

[11] Patent Number: 5,418,954
[45] Date of Patent: May 23, 1995

[54] METHOD FOR PREPARING AND DYNAMICALLY LOADING CONTEXT FILES

[75] Inventor: Edwin S. Petrus, Santa Clara, Calif.

[73] Assignee: Cadence Design Systems, Inc., San Jose, Calif.

[21] Appl. No.: 717,535

[22] Filed: Jun. 19, 1991

[51] Int. Cl.$^6$ ............................ G06F 9/44; G06F 9/45
[52] U.S. Cl. ...................................... 395/700; 364/280;
364/280.4; 364/283.1; 364/DIG. 1
[58] Field of Search ............... 395/375, 600, 650, 700,
395/425; 364/280, 280.4, 283.1

[56] References Cited

U.S. PATENT DOCUMENTS

| | | | |
|---|---|---|---|
| 4,620,286 | 10/1986 | Smith et al. | 395/77 |
| 4,931,931 | 6/1990 | Syre et al. | 395/650 |
| 4,989,132 | 1/1991 | Mellender et al. | 364/200 |
| 5,051,893 | 9/1991 | Tenny et al. | 364/200 |
| 5,075,847 | 12/1991 | Fromme | 395/700 |
| 5,175,828 | 12/1992 | Hall et al. | 395/375 |
| 5,239,617 | 8/1993 | Gardner et al. | 395/12 |
| 5,301,327 | 8/1994 | McKeeman et al. | 395/700 |

OTHER PUBLICATIONS

Ross et al., "Paging Strategy For Prolog Based Dynamic Virtual Memory", IEEE, 1986, pp. 46–57.
Dzahini et al., "Layout Automation of CMOS Analog Building Blocks with Cadence", IEEE, 1990, pp. 86–88.
Barnes, "Skill: A CAD System Extension Language", 27th ACM/IEEE Design Automation Conference, 1990, pp. 266'271.
Karam, "An Icon–Based Design Method for Prolog", IEEE, 1988, pp. 51–65.
Wood et al., "Skill-An Interactive Procedural Design Environment", IEEE, 1986, pp. 544–547.
Custer, Linda, "Prograph Swaps icons for code", MacWeek, vol. 4, No. 10, Mar. 13, 1990, pp. 49–50.
Menzies, Tim, "Domain–specific Knowledge representation", AI Expert, vol. 4, No. 6, Jun. 1989, pp. 36–43.

Primary Examiner—Kevin A. Kriess
Assistant Examiner—Dennis M. Butler
Attorney, Agent, or Firm—Judson D. Cary; A. C. Smith

[57] ABSTRACT

A LISP-based library of files of selected functionalities are preprocessed into Context files of machine-readable codes as the smallest usable modules of massive computer programs for distribution to users and for independent operation on a computer as each such functionality is required by a user. Such Context files are initially prepared after assuring that each Context file which relies on the contents of any other Context file is rendered independent by copying the dependent material into the Context file for storage and distribution therewith. At run time, each Context file is loaded into a memory segment of a computer only as needed in response to selection by a user, and as loaded into the computer for execution, clashes among names or keys associated with each newly-requested functionality in a session are resolved against the keys or names of the Context files already in memory segments of the computer.

13 Claims, 9 Drawing Sheets

METHOD FOR PREPARING AND DYNAMICALLY LOADING CONTEXT FILES

This invention relates to a system and method for efficiently operating on very large computer programs, and more particularly to a system and method for assembling and dynamically loading selected incremental portions or modules of a large computer program.

BACKGROUND OF THE INVENTION

Very large computer programs may commonly include static segments in the form of low-level executable programs, usually written in computer languages such as C or FORTRAN or C++ to administer internal functions such as memory management, I/O control, and the like. One difficulty encountered in such large computer programs is in breaking up the program into logical modules or subsets that can be conveniently packaged for sale to customers who can thereby select the minimal few modules needed for the functional capabilities required in a given system. These large computer programs also commonly include other segments in the form of higher level languages such as 'SKILL', which is a LISP-based language commonly used in the Computer-Aided Design (CAD) industries. Although SKILL is a less efficient language than C or C++ or the other low-level languages, it is nevertheless a computer language of higher descriptive power that can be used to develop software much faster, and that can be used to rewrite software much quicker.

It is desirable to break up the SKILL segments and the static segments in such a way as to facilitate composing software products with certain capabilities on demand. In addition, it is desirable while running a large computer program not to overload the computer with all of the software loaded at once. It is commonly more desirable to run the minimal amount of software needed to accomplish a selected task. Thus, it may be desirable to run selected static segments of the program and then on demand, bring in the specific SKILL segments that are needed for the requisite functionality. Therefore, it is desirable to load the selected SKILL segments of a large program, on demand, in such a way that a user is not aware that the computer is loading in additional software, or that the computer is doing something else regarding management of the requisite software than is actually requested by the user in directing the computer to perform some functionality.

SUMMARY OF THE INVENTION

In accordance with the present invention, a large computer program is specifically configured during integration, or fabrication, of the program in order to facilitate selective operation of requisite segments during run time of the program by the customer. In order to break up a large computer program into logical pieces or segments, named keys are allocated to each segment containing the requisite functionalities. Thus, keys may be assigned to segments that facilitate reading of a database, and other keys may be assigned to segments that facilitate writing into a database. A user may therefore acquire the read keys but not necessarily the write keys. And, each key is associated with several things that are critical for a given functionality including SKILL Codes associated with such keys. Thus, the SKILL Codes may be predetermined to go with the keys during integration or fabrication of the computer program. The SKILL Codes represent the actual source programs that may constitute a collection of files or procedural sequences or data which represent the selected functionality as a complete 'executable'. The 'executable', once linked together, is not breakable apart into additional subsets or segments. Such an 'executable' is thus fabricated into a static segment of instructions that the computer understands and can run as one contiguous segment of the program. At integration time, SKILL Codes are associated with such 'executables' to provide representations of the SKILL-based programs in computer memory as pointers and numbers. Thus, a given functionality has an associated SKILL Code and such pointers and numbers that constitute the internal representations of the SKILL Codes are saved into a file that is referred to herein as a 'Context'. Each Context among several Contexts has an associated key that can constitute a convenient module of program that corresponds to one functionality. Thus, a Context has an associated key as the program is integrated or fabricated with the SKILL Codes selected to create Context files so that a user may select the 'executable' including the static binary that cannot be broken down to smaller units or modules, and may select one or more Contexts corresponding to the selected keys, or functionalities.

At the time of running the computer program, the static binary is operated as a module that does not break down smaller and that likely includes low-level C code, or the like. The user may request a functionality that has SKILL Code associated with it. The computer can then retrieve the Context associated with that functionality without the user noticing a change in computer operation.

Two or more functionalities might interact during computer operation and each retrieved Context is actually represented by the image that was saved at integration time, where the 'image' is the interpreter's internal representation of the SKILL source codes. The image may be considered as a "snapshot" of the memory segments and the numbers or pointers inside those memory segments which are the computer's equivalent of the text of the SKILL codes. Thus, no analyzing, and no parsing, and no syntax checking, and no reading of the text of the source code need be done since the Context already constitutes the 'predigested' or converted, machine-readable form of the source code, as previously described. New functionality requests are entered much faster as Contexts than by reading source code and performing the requisite analyses and conversions at load time, and can be merged with existing Contexts in the memory so that it all functions as one piece of software. The user does not realize that several modules of software are thus merged and integrated for operation as one piece of software. The present invention therefore retrieves core-function executable programs but not any of the unnecessary functionalities until they are selectively requested. By way of example, for a word-processing functionality the capability of reading the text will always be loaded by default so that, as a minimum, text (or other data) can be read. Then, upon request for the functionality to, say, edit the text, the appropriate SKILL Context would be retrieved for actually doing the editing. Thus, functionalities that are not needed during an operating session are not loaded, and are only loaded in the manner described as requested during an operating session.

DESCRIPTION OF THE PREFERRED EMBODIMENT

Figure 1:
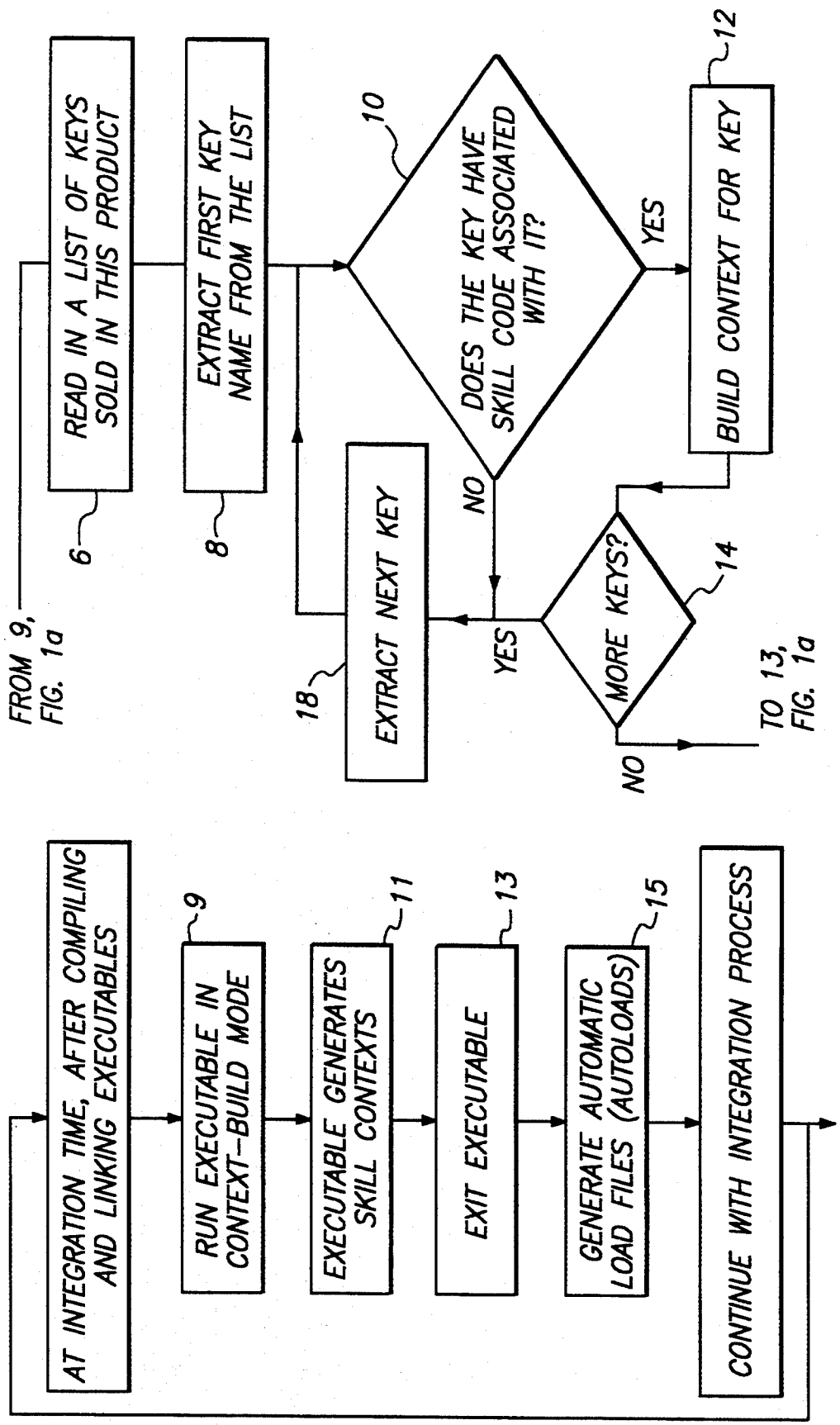
FIG. 1(a) is a flow chart illustrating the integration process by which a program is fabricated in the Context build mode in response to SKILL codes.
FIG. 1(b) is a flow chart illustrating an expansion of the process for generating SKILL Contexts in FIG. 1(a) using a list of keys to process the respective SKILL codes.

Referring now to FIG. 1(a), there is shown a flowchart which illustrates one embodiment of the process of the present invention that proceeds initially from the stage of program fabrication, or integration, at which a programmer previously completed compiling and linking of the 'executables' that is, previously compiled all the FORTRAN, C, C++ programs and created and linked one 'executable' that is ready to work. The 'executable' program may be executed in a Context-build mode 9 for generating the Context. There may be a conventional initialization routine (not illustrated) by which the computer, such as illustrated in the block diagram of FIG. 9, checks operation of memory, loads a BIOS program, and the like, until the computer is conditioned to receive inputs from the user. Of course, an input need not be from a user but may be supplied from a 'script' that emulates the inputs which would be supplied by a user in a sequence of commands for the 'executable' to execute automatically. Thereafter, such a script executes commands 11 to generate SKILL Contexts, in the manner as later discussed in detail herein. Once all the Contexts are generated, and all the associated SKILL Codes are assembled, the 'executable' exits 13 the Context-build mode and the auto load files 15 are generated. In this procedure, which is described in greater detail later herein, all the SKILL Codes and all the corresponding names of functions/procedures are picked up and assembled in correlated separate files for the procedure names and associated Contexts, so that each procedure name has a related Context name.

Referring now to FIG. 1(b), there is shown a flow chart illustrating the method for processing a list of available keys. For each key 8, a test is made to determine 10 if there is an associated set of SKILL codes. If a set of SKILL codes is associated with the tested key, then a Context is generated 12. Otherwise, the next key is extracted 18 and the process is repeated 14 until the list of keys becomes exhausted.

Figure 2:
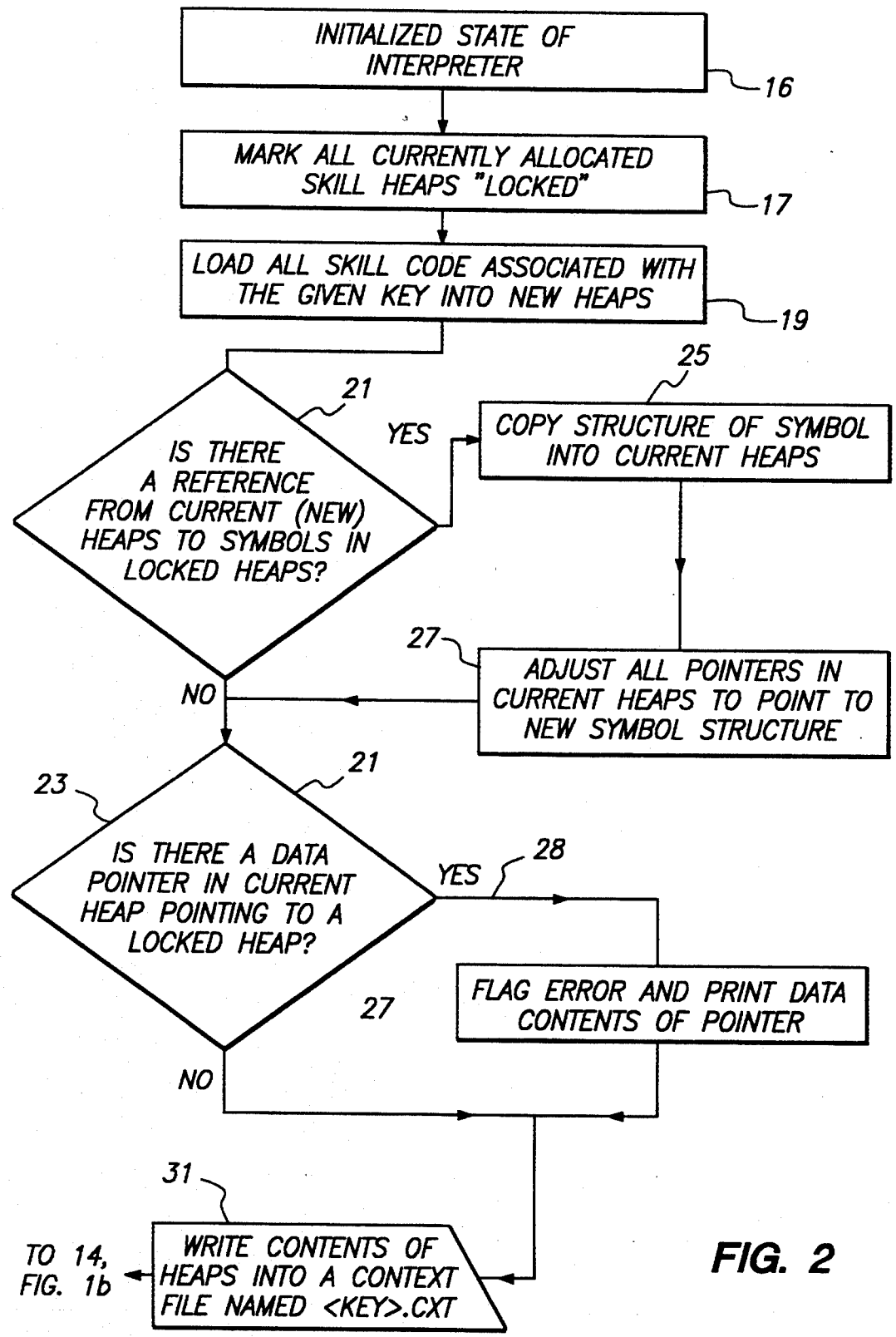
FIG. 2 is a flow chart which illustrates an expansion of the integration process illustrated in FIG. 1(b) for generating Contexts.

Referring now to FIG. 2, there is shown a flowchart of the procedure for generating SKILL Contexts in accordance with the step 12 of FIG. 1(b). The initial input to this procedure is basically the state of the interpreter. The interpreter, which is essentially another module of the 'executables' has a given state 16 at this point. There are no SKILL Codes loaded. Thus, at this given, bare minimum state, the procedure can accept a SKILL Code and execute the SKILL Code. And, the interpreter accepts commands that would have initialized the interpreter 16 and that come from the integrator in the course of preparing the computer program. The commands prepared by the integrator control this 'executable', for example, to mark 17 the currently allocated SKILL 'heaps' locked while in Context-build mode, to be ready for a new Context. 'Heaps' are referred to herein as segments of memory allocated by the SKILL interpreter for SKILL Codes and data. These segments of memory are predetermined in size, typically about 4 k, that the SKILL interpreter can deal with as minimum increments. The integrator previously prepared the command called "Set Context", with a name given to it, known as a key name, such as "DB (database) Read." That constitutes the key that will be associated with a Context so that whatever SKILL Code is read in subsequent to this command, it will be known as the Context for the "DB Read" key. Thereafter, with a command prepared by the integrator such as "load", such command will load 19 the SKILL Codes associated with the given key into new heaps. The command name will more specifically be "load startup.il", which is the name of a generic file associated with a Context. This brings in all the SKILL codes/files associated with "DB Read", where the '.il' file name extension means that it refers to a SKILL file.

Thus, at integration time, the programmer included the command "load" that will cause the loading of all the SKILL Codes, say, associated with "DB Read" Contexts. All the SKILL Codes will be normally loaded in a conventional manner common to interpreters. However, since all the previous memory heaps were locked 17, now the new Codes are loaded in and the new Codes reside in fresh heaps to provide distinction between a new Context and a Context that was already processed. Thus, new memory heaps have no "lock" mark on them and are fresh, ready to be saved. However, some functionalities are interdependent on other functionalities and, at some point, it may become necessary to bring in segments from an old Context that the current Context shares. Therefore, at any time when a Context is to be saved, the present invention determines 21 what sort of data that Context shares with other, already processed, Context in order to copy or duplicate 25 some of that data so that, in the event a new Context is to be loaded on its own without the previous Contexts that it depended upon, the new Context with the duplicated portions of data will be able to function with the associated copied portion of data with it. Because the Contexts are incremental, or broken into separate pieces, it is undesirable to bring in a Context during a session that was triggered from another Context because its data was necessary. Therefore, the data is usually duplicated in the separate pieces so they can function independently. Therefore, if a pointer from this current Context (i.e., from this new fresh set of heaps), points to anything that was previously locked, that pointer into the locked heap results in copying of some of those structures into the new heaps 25. However, such duplicate structures existing in the same session may create problems, so the current Context should point to the newly duplicated structures. Therefore, all the pointers in current heaps in the current session are adjusted or updated 27 to point to these new copies. Once this is done, there should be no pointer of importance in the fresh heaps pointing to anything outside of the current session 23. The process thus determines if there is a data pointer in the current heap pointing to a locked heap and, if there still is 28, that indicates an error which is flagged 29 and the data associated with the contents of that pointer is printed out. With the error flagged, or no further data pointers in current heap pointing to a locked heap, then the contents of the heaps are written out 31 into a Context file named <KEY>.cxt, where the .cxt extension designates a SKILL Context file. Therefore, if current heaps are clean and there are no pointers to anything outside of the current heaps, and the Contexts are written out, the process can be repeated to lock all currently allocated SKILL heaps 17 and load new SKILL Codes 19, as previously described, in order to build a whole sequence of Context files designated by a name <KEY> and extension .cxt.

Figure 3:
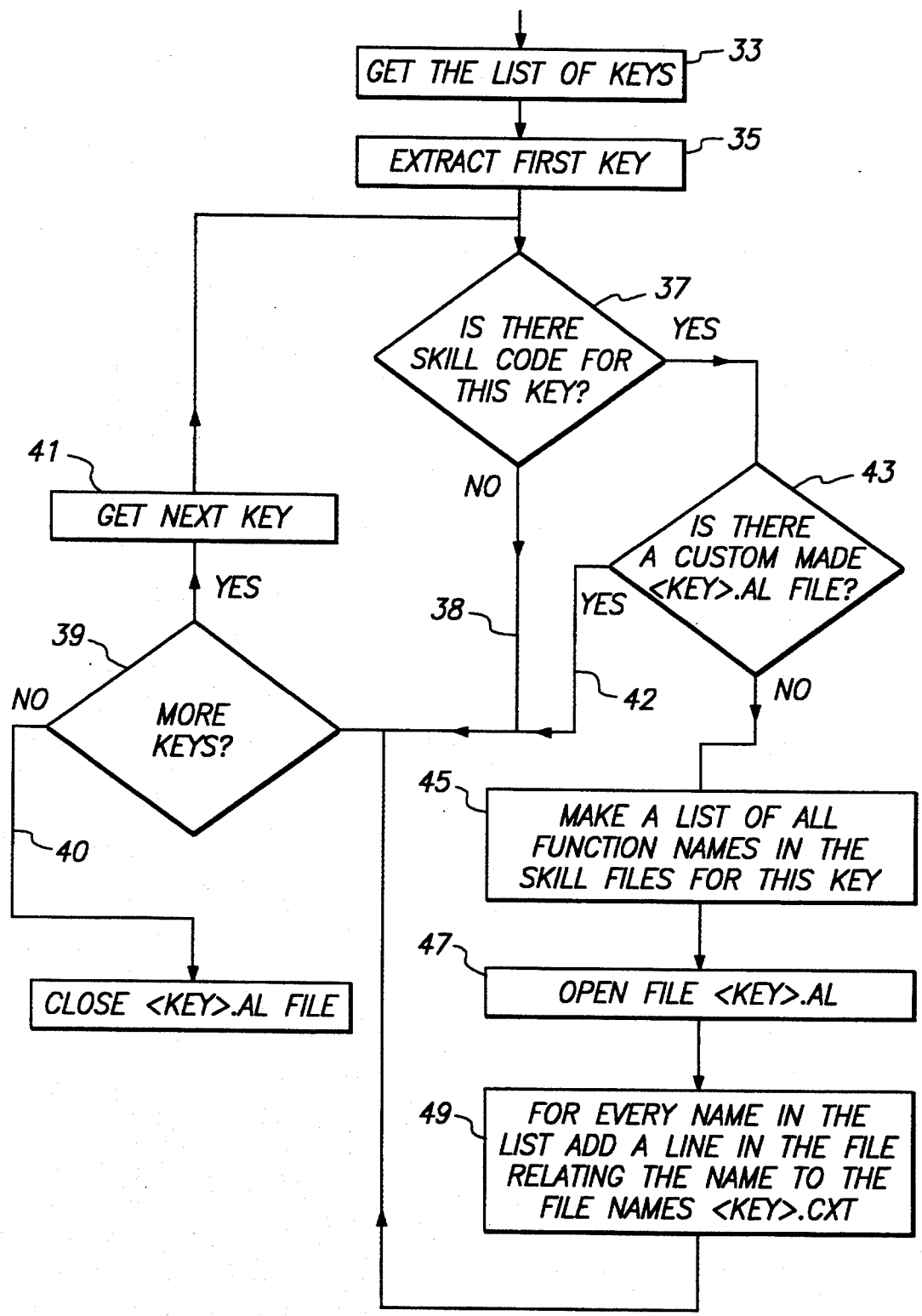
FIG. 3 is a flowchart illustrating an expansion of the process of FIG. 1 for generating automatic load files.

Referring now to FIG. 3, there is shown a flow chart of an expansion of the process 15 in FIG. 1 that builds the auto load files. From the process that was previously described with reference to FIG. 1, a UNIX-based shell script is available which textually reads in the SKILL files. From such text, anything named a procedure in the SKILL files has a Context. If a procedure is found, the name of the procedure is stored in a separate file with the associated name of the Context. This can be done for every possible key, or Context name, and from a list of all such keys 33, the first one is extracted 35 for processing to determine 37 if there is SKILL Code association with that key. If there isn't 38, the next key is retrieved 39, 41 and if there are more keys, the next key is retrieved and tested for SKILL Code associated therewith.

If it is determined 37 that there is SKILL Code associated with a retrieved key, then the retrieved key is tested 43 for the existence of a custom-made, auto-load file. Auto load files may have an extension of .al associated with them. An auto load file can be customized by the integrator or programmer, if he knows exactly what his entry point procedures are into a Context, or such auto load files can be generated automatically. Thus, if a custom-made .al file is identified 42, the automatic script does nothing, and the process checks 39, 41 if there are more keys.

If there are not custom-made entry points detected, the shell script will make a list of all the function names 45 in the SKILL files associated with a retrieved key by extracting the function names or the procedure names. Then, a file is opened called <KEY>.al, where the <KEY> could be any key name. This file will therefore include the function name or the procedure name and the associated Context name 49. Thereafter, by looping back to determine whether there are any more keys 39, 41, the entire list of keys will be processed in similar manner and the <KEY>.al file will be closed 40. At this stage of program integration, there is a set of Contexts and a set of auto-load files that can be supplied to customers in minimum modules or units of functionality.

Figure 4:
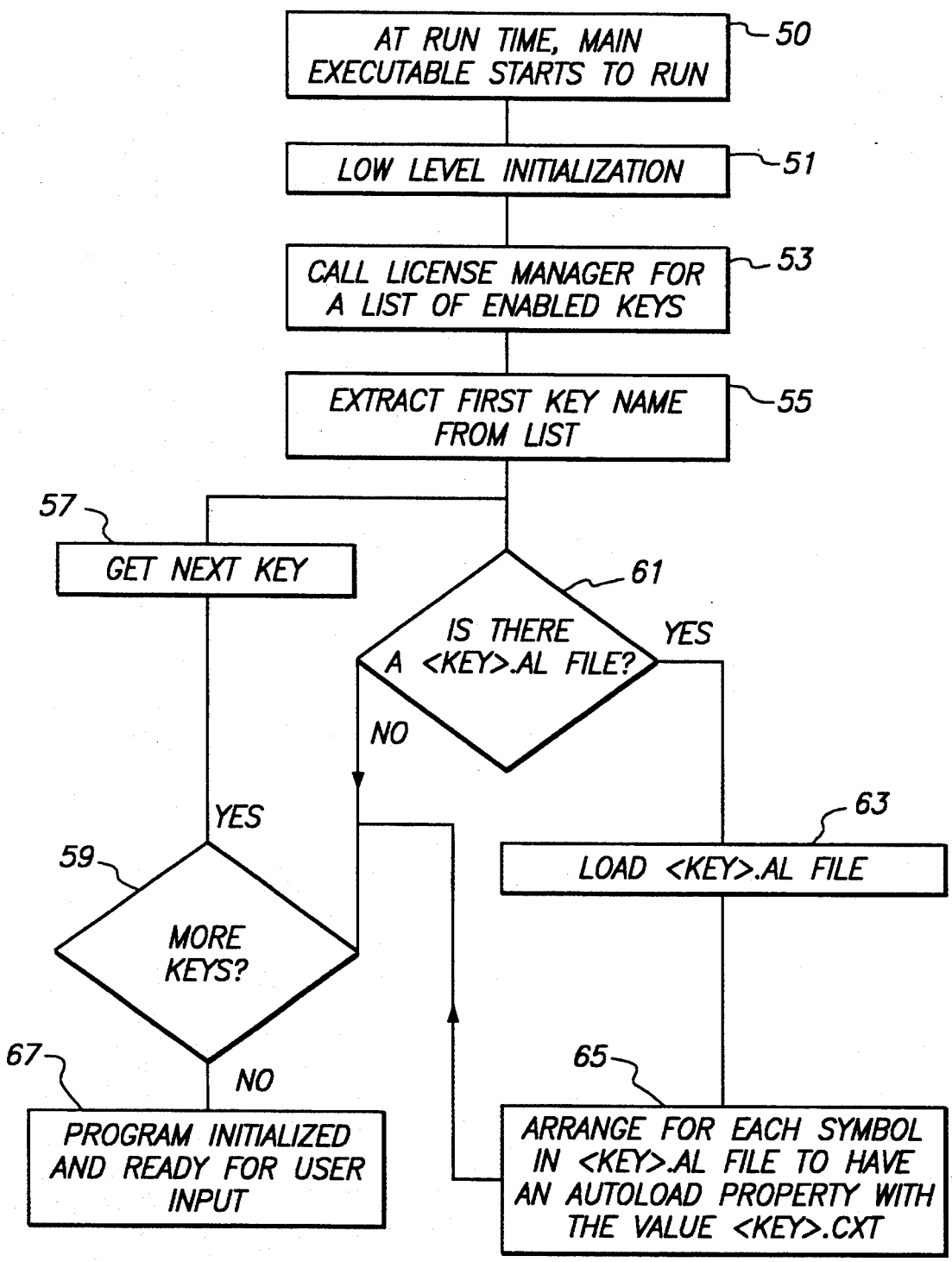
FIG. 4 is a flowchart illustrating operation of the processes at computer runtime.
Figure 9:
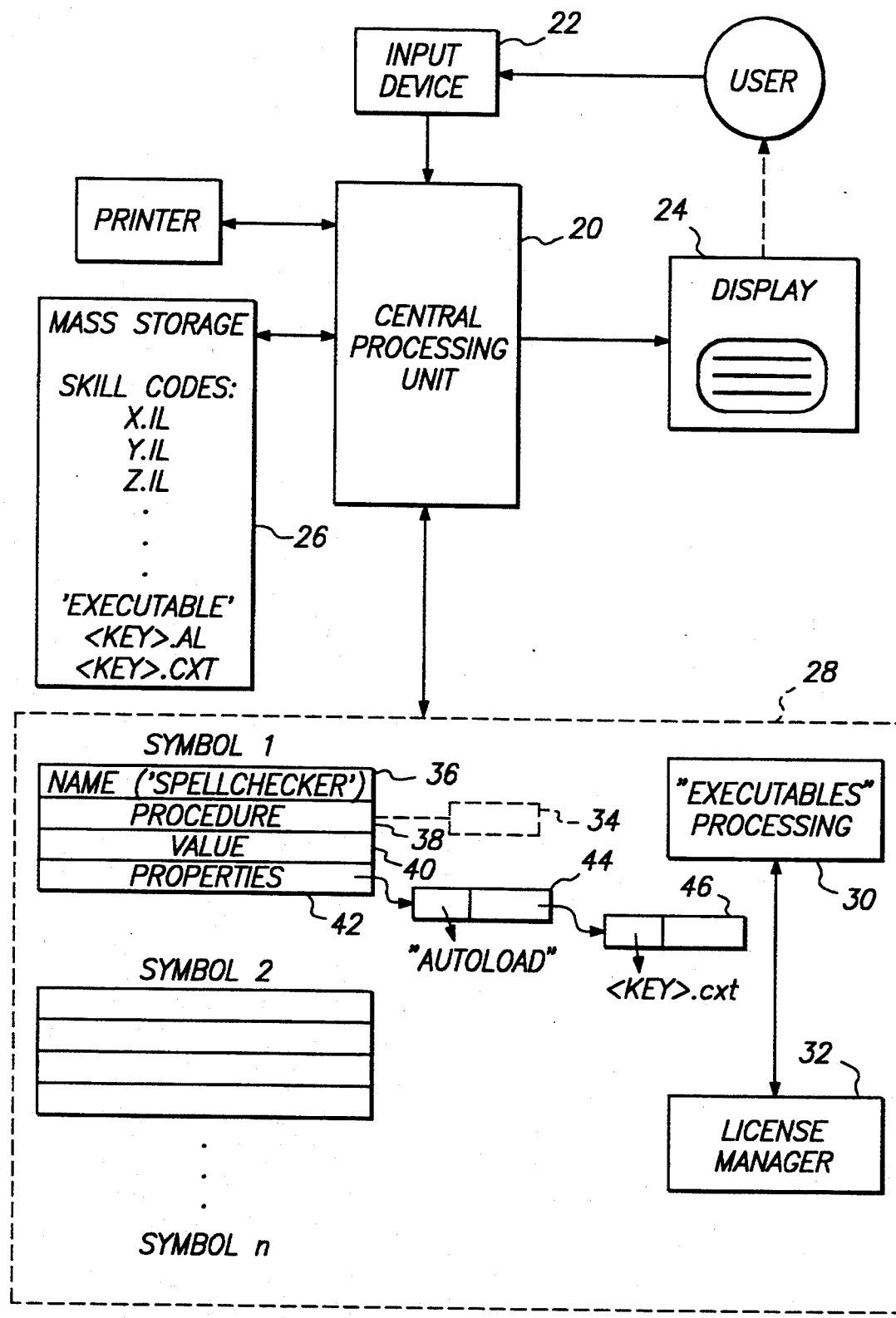
FIG. 9 is a pictorial block schematic diagram of a typical architecture of a conventional engineering workstation on which the process of the present invention may be operated.

Referring now to FIG. 4, there is shown a flow chart which illustrates run time operation after program integration. The program thus integrated or assembled may be called upon by a user to provide a selected functionality (e.g., logic simulation, word processing). Upon command to start at runtime, an 'executable' starts a low-level initialization 51 of the host computer, for example as illustrated in FIG. 9, in conventional manner. Then, a License Manager module of software 53, installed in a computer that executes the software, is activated to determine a list of enabled keys associates with this user's program. The License Manager module of the program 53 holds a list of all keys that are active for this user. Thus, the 'executable' contacts the License Manager module 53 and obtains the list of all the active keys for this user. From the list of keys, the first name of a key is retrieved 55 to determine 61 whether there is an associated file called <KEY>.al, as previously generated by the program integrator in the manner previously described herein. It should be noted here that the program associated with that key is not loaded, rather only the associated procedure and Context name and not the full program is loaded 63. Each <KEY>.al file is arranged to have an auto-load property 65 with a value of <KEY>.cxt. Thus, within the memory 28 of the host computer, as shown in FIG. 9, each procedure is structured to represent the procedure name, and will have a property associated with it that will have the name of the associated Context. But, such structure does not have any function definition or data yet, just the name of the associated context. Thereafter, the process tests for more keys 59, 57 until all the active keys that program user is limited to have been identified and processed. Therefore, for every procedure among the active functionalities that the user can call up, there is a property in the memory structure 26, with a value <key>.cxt, that identifies where the definition for it comes from.

Figure 5:
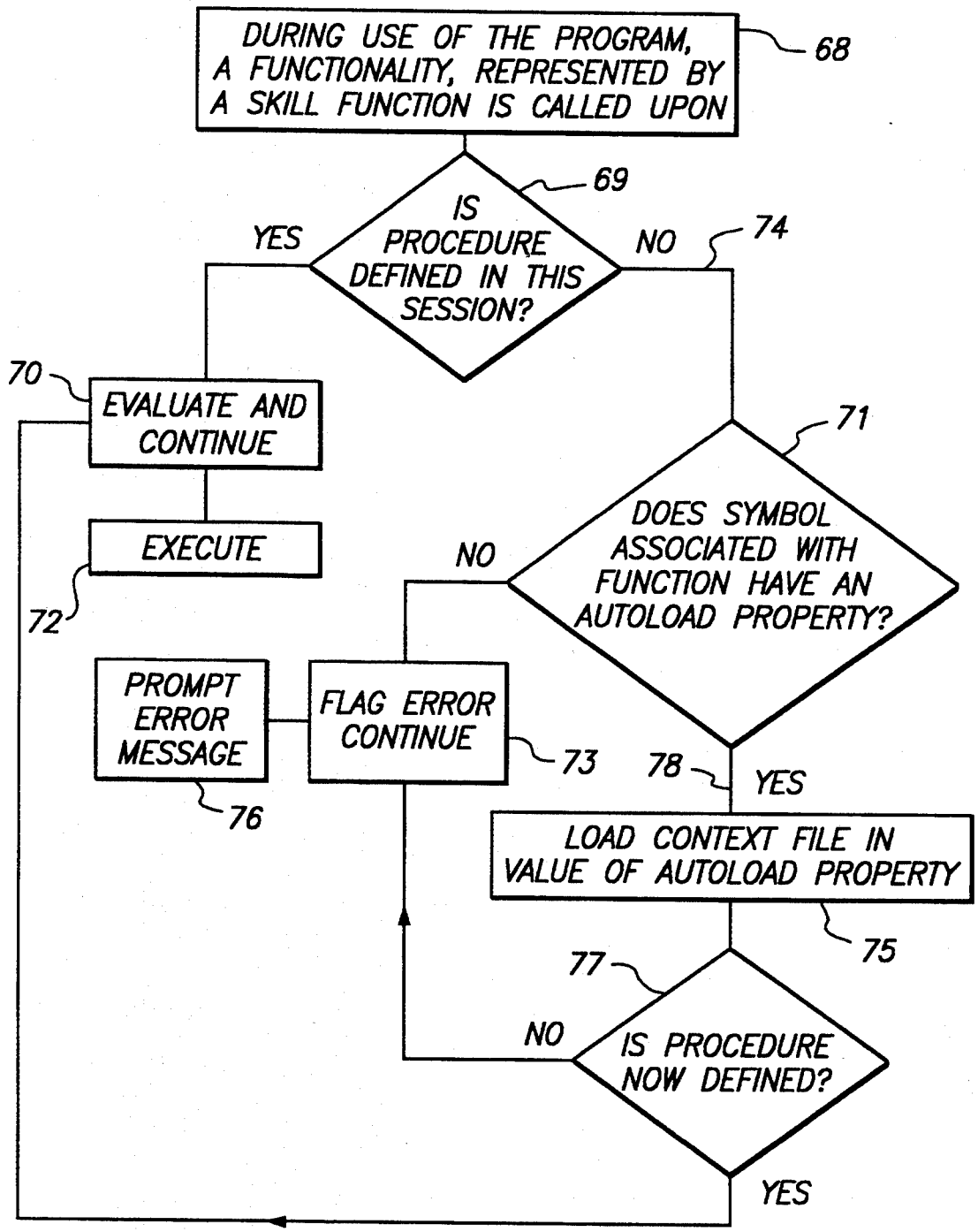
FIG. 5 is a flowchart illustrating the process by which SKILL-based functionalities are executed.

Referring now to the flow chart of FIG. 5, the user can operate the program and, when the user calls for a selected functionality (e.g., spell checker, logic simulator) 68, the requested procedure is tested 69 for whether such procedure is defined in this session. If already defined, the procedure is evaluated and continued to execution 72 of that portion of the program which provides the requested functionality.

If the requested procedure is not defined in this session 74, then the request is tested for whether the symbol, as later described herein, associated with the requested procedure or function has the auto load property 71. If it doesn't, then the user is attempting to use a functionality that he's not supposed to, and this condition flags the error 73 for prompt of an error message 76.

If there is an automatic load property associated with a symbol, that means the Context from which it came is known and the Context can be loaded 75, as later described in detail herein. After the Context is loaded, it is tested 77 for whether the procedure is now defined. If the procedure is defined, as it should be knowing the Context, then the procedure is evaluated and continued to execution 72 so the user can operate the program with the requested functionality. However, if when tested 77, the procedure or function still has no definition after loading the Context, then there is an error 73 which is flagged 73 and an error message may be displayed 76.

Figure 6:
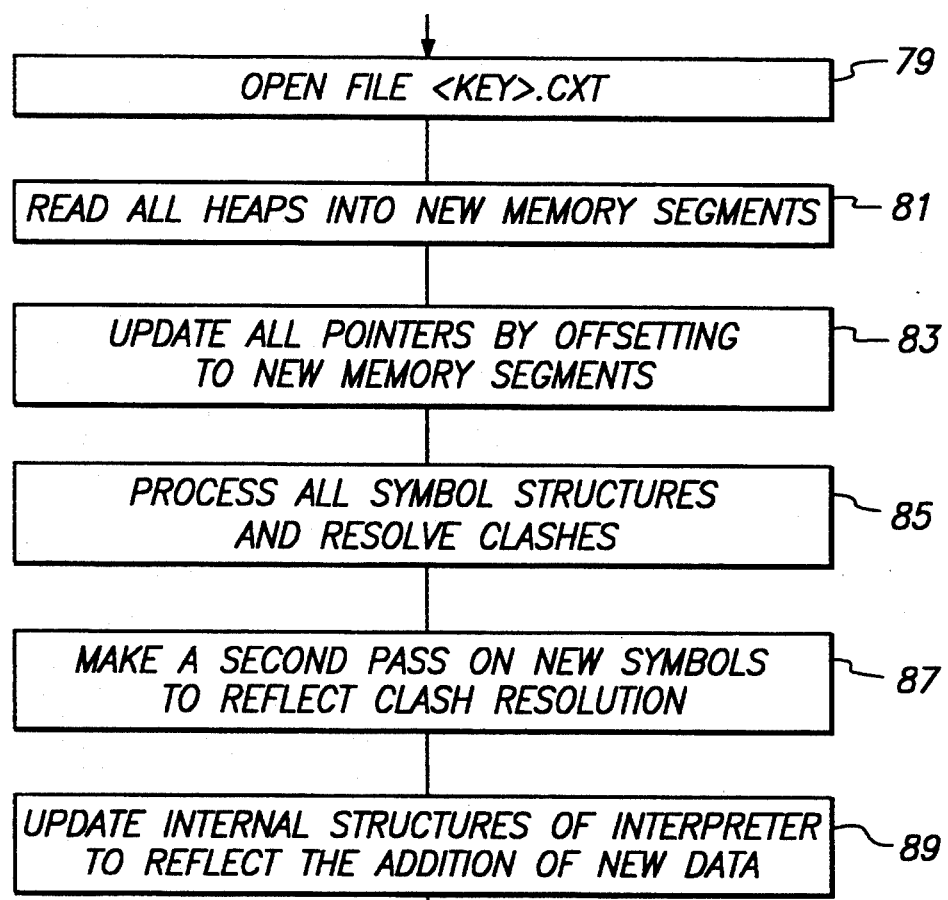
FIG. 6 is a flowchart illustrating an expansion of one of the steps in the flow chart of FIG. 5 involving the loading of a Context file.

Referring now to the flow chart of FIG. 6, there is illustrated the process by which the Context file is loaded 75, in FIG. 5. To load the Context file, the <KEY>.cxt file is read and accessed, or opened 79. In that file is the heaps that were saved at integration time, as previously described. Thus, all the heaps are read 81 into the memory 28 of the computer or workstation, as illustrated in FIG. 9. Now, because the old pointers were saved with the values of the pointers, such values will no longer be valid in this new session because they now have new memory allocations. However, the segment of memory 28 in which each pointer resides is known. Therefore, by a simple process of offsetting, the old segment which had a number pointer value X, and the new segment which has the number pointer value Y yields a difference between the two number values that is added to the new pointers to update 83 them in this session.

Then, all the symbol structures are processed 85 in the detailed manner later described herein to resolve all clashes that may result from the new symbols of the newly-loaded Contexts in conflict with symbols having similar names in the current memory segment. Thus, as previously discussed, data structures copied when Contexts were saved, may cause a clash. Then, a second pass 87 is taken over all of the new memories thus allocated in order to amend the clashes just resolved in the manner as later described in detail herein. Thus, for a symbol that became obsolete, going back over the memory amends every pointer that was pointing to that now-obsolete symbol in order to make it point to the symbol that prevailed in resolving the clash 85.

Once the new Context is loaded, internal structures that count memory usage need to be updated 89. Thereafter, the process tests whether the requested procedure that caused this Context to be loaded is now defined, as previously discussed at step 77 in FIG. 5.

Figure 7:
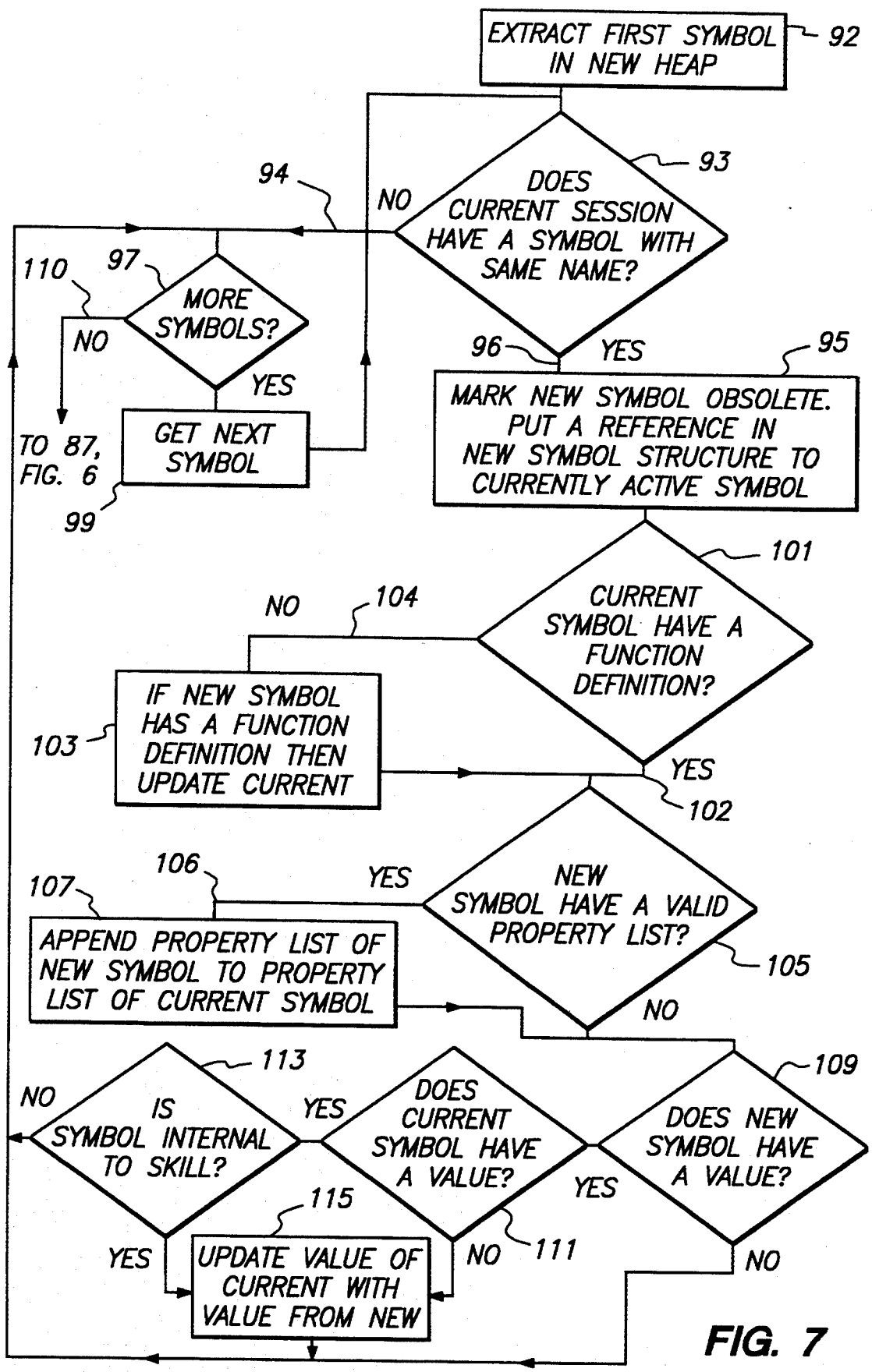
FIG. 7 is a flowchart illustrating an expansion of the step in FIG. 6 that processes all the symbol structures in the Context.

Referring now to FIG. 7, there is shown a flow chart that illustrates the detailed process of resolving clashes in step 85 of FIG. 6. Thus, after offsetting all pointers 83 to new memory segments in the process of FIG. 6, all the new heaps are designated and all the new memory segments are allocated for the new Context. The new heaps include symbol structures that are associated with procedures or variables. For the first such symbol extracted 92, it is tested 93 to determine whether the current session has a symbol with the same name, or, whether there is a loaded Context that had a symbol with the same name. If there is no symbol with the same name 94, then the process checks 97 for other symbols to be processed, and if there are none, the process continues to make the second pass 87, as previously described with reference to FIG. 6.

If there is a clash of symbols 96, then the current symbol just created for the new Context is marked as obsolete immediately 95, but it is not yet discarded. Instead, it is tested 101 to determine if the symbol has a function definition or to consider the new symbol that was immediately marked obsolete 95 (and that was current in the session before the new Context came in) and test it 101 for whether it has a function definition. If it does 102, the process proceeds because the function definition that might have come with the new Context is ignored. Thus, new Contexts, for example, prepared by a user do not override functionalities prepared by the program integrator. If the current symbol has no function definition 104, then the function definition is taken from the new symbol that was marked obsolete and is applied as the function definition on the symbol in the current session 103. In an interpretive computer language such as LISP-based SKILL, this amounts to swapping of pointers. Thus, the symbol that is to continue living now inherits the function definition of the symbol that came from the Context. The symbol that is to be discarded is then tested 105 for whether it has a property list to determine if there are properties associated with that symbol that should be saved, and if there are 106, then all those properties are appended 107 to the properties of the symbol that is to continue living. If there are not properties associated with the new symbol, then it is tested 109 to determine if the symbol had a value associated with it (as in conventional programming language where X has a value =1). And, if the new symbol marked obsolete has a value, then the current symbol is checked 111 to determine if it has a value. So, if there are two values, the current symbol is tested 113 to determine if the symbol is internal to the SKILL interpreter. If it is an internal symbol, then the symbol for the new Context overwrites the current symbol 115. If it is anything other than an internal symbol and there is a clash in values, the current symbol holds on to its value and the new symbol that was loaded and marked obsolete is discarded and the process loops back to 97 to test for more symbols. If there are more symbols, the next symbol is retrieved and processed in the manner described until all symbol clashes are resolved 110.

Figure 8:
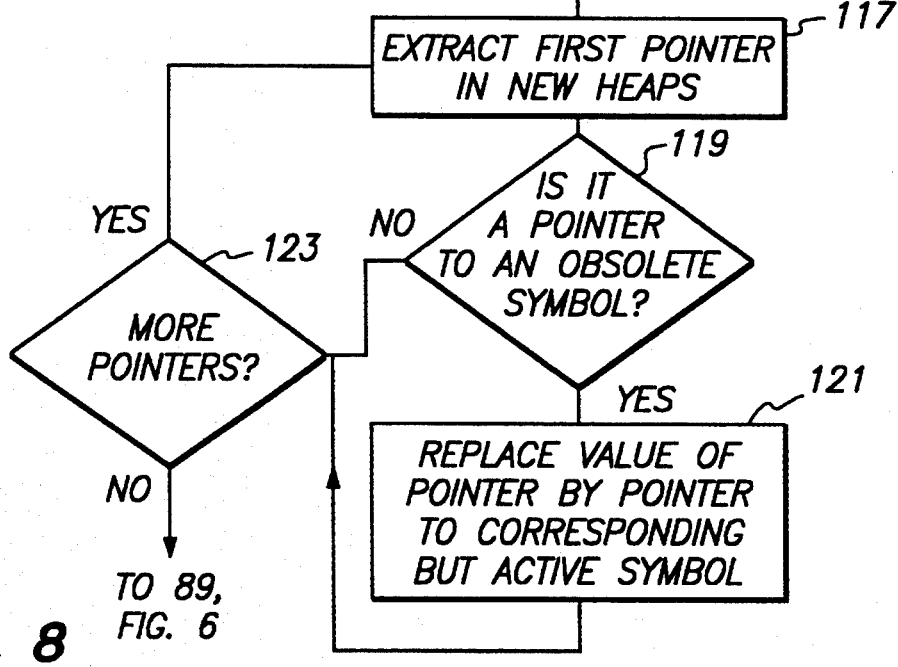
FIG. 8 is a flowchart illustrating an expansion of the process in FIG. 6 involving an additional pass on the symbol structures in the Context to resolve any clashes with existing Contexts.

At the end of the process illustrated in FIG. 7, the clashes among symbols associated with new Contexts, and symbols that are already there in a session are resolved in terms of function definition, in terms of property lists and in terms of values. If any of these characteristics were missing, they were left alone if there was a clash, and, one or more symbols in the new Context loaded in were marked as obsolete. Thus, internal pointers to obsolete symbols must now be resolved. With reference to the flow charts illustrated in FIGS. 6 and 8, the process includes making a second pass 87 on new symbols to reflect the clash resolutions. If there is any pointer to an obsolete symbol, the pointer is changed to point to its equivalent surviving symbol. This is accomplished by extracting the first such pointer in the new heaps 117. The process test whether such pointer is pointing to an obsolete symbol 119. If it is an obsolete symbol, then the value of that pointer is replaced 121 by the value of the pointer to the good symbol that is to live on (i.e., the symbol that survived in the clash resolution). If the pointer is not pointing to a new symbol, the process tests 123 whether there are more pointers to be processed. If yes, the next pointer is extracted 117 for processing in similar manner until all pointers in the new heaps are processed.

If there are no more pointers, the process continues at step 89 in FIG. 6 which updates the internal structures of the interpreter, as previously described, before returning to the process illustrated in FIG. 5 to determine if the requested procedure is now defined 77 and can be executed 72.

Referring now to FIG. 9, there is shown a pictorial block schematic diagram of a conventional "workstation" type of computer on which the process of the present invention may be operated. The conventional workstation commonly includes the central processing unit (CPU) 20, the working memory 28 and the mass storage device 26. Other peripherals such as keyboard 22, display 24 and the like, are conventionally included. The program for initially configuring or setting up the workstation at initialization time resides on the mass storage device 26. Thus, when the user starts a main program including the so-called 'executable' previously described, that program starts a process involving the working or main memory 28 which configures the workstation to enter the process illustrated in FIG. 4. That is, at runtime, the main 'executable' 30 starts to run 50, and the method proceeds to the low-level initialization 51 included in the 'executable' segment of memory 30 that is running in memory 28.

After initialization 51, as illustrated in FIG. 4, the license manager segment of memory 32 is accessed 53 for a list of enabled keys. This is an independent process that operates in the memory 28 to return a list 55 of keys as requested by the 'executable'. Thereafter, the license manager 32 is not involved, and the 'executable' 30 controls the processing of each key supplied by the license manager 32. The mass storage 26 is interrogated to determine 61 if there is a corresponding <KEY>.al file, i.e., the auto-load file. If there is one, that file is read and loaded 63 into the memory 28 under control of the 'executable' 30. Once such file is loaded the image in the segments of memory 28 will be that of a series of symbol structures 1, 2, ... n, as illustrated in the memory 28 of FIG. 9. The symbol structures have four main fields or subsegments, including the name 36, as a string of binary bits, that determines the name of the function or procedure that a user will be dealing with (e.g., a "spell checker" function for use with a word processing program.

The other fields on this symbol include the procedure definition 38 which is the main body of the procedure, and the corresponding value 40 for that symbol. Thus, at the initialization time, the step 63 in FIG. 4 ("load the .al file") loads a symbol into memory 28, followed by "arrange for each symbol in <KEY>.al file to have an auto load property with the value <KEY>.cxt" 65. The field 42 of a symbol also includes it 'properties' which includes a pointer into two data structures in memory segments that are arranged in a linked-list format, whereby each structure includes a pointer to the next associated structure. Thus, the first segment includes an auto load property 44, called 'auto load', in the symbol and that property points to another memory segment that includes the name or <KEY> of the associated .cxt file 46 that it comes from. This indicates where the definition of the selected procedure will come from, and that the .cxt file resides in the mass storage 26. However, such procedure is not loaded at initialization time. Thus, after step 65 in FIG. 4, there is a series of symbols with all their structures arranged as segments of memories that point to associated other segments, with the properties 42 of the symbols arranged as linked lists.

After this is accomplished for all the keys that are acquired from the license manager segments 32 in memory, then as illustrated in FIG. 4, more keys are tested 59 in a loop that continues the process to completion. At the end of reading in all the .al files (i.e., the auto load files), the memory segments are arranged substantially as illustrated pictorially in FIG. 9 at the conclusion of the initialization process.

Then, following initialization and for operation of the program, reference is made to FIG. 9 and to FIG. 5, step 68 in which, "During use of program, the functionality represented by a SKILL function is called upon" by a user. Such functionality may, for example, be a spell-checking capability that was not loaded previously into the memory 28 under control of the 'executable' in memory segment 30. The 'executable' at this point controls execution of a procedure called 'spell checker' to pick up the symbol structure designated "Symbol 1" as the structure corresponding to "spell checker." The list of fields on this structure is inspected 69 for the procedure field 38 (which is empty because it was not loaded). Then, at step 71 in FIG. 5, the test "Does symbol associated with function have an auto load property?" is performed to determine that, in this case, Symbol 1 has a field 42 of properties which point to any autoload field 44 which, in turn, points to the associated <KEY>.cxt file. Now, with the <KEY>.cxt file extracted from this linked list, the 'executable' controls the loading 75 of the Context file and value 40 of auto load property 42, 44, as illustrated in FIGS. 5 and 9. The <KEY>.cxt file is loaded in memory 28 from the mass storage 26. Once the load is completed in the memory 28, a pointer is added to the procedure field 38 to designate another segment 34 of memory that will store the definition of the selected procedure (e.g. the "spell-checker") that is associated with the .cxt file.

Therefore, the step 77 of FIG. 5 tests whether the procedure is now defined, and determines that that procedure field 38 now actually does contain a valid entry in memory which came from mass storage 26. At step 70 in FIG. 5, the procedure is evaluated and the process continues (e.g. executes 72 the "spell-checker" functionality). If for some reason during the loading of the <KEY>.cxt file, the entry in the segment of memory 34 was corrupted, an error will be flagged 73, as indicated in FIG. 5.

It should be noted that symbols in memory 28 correspond with the <KEY>.cxt files that are available from mass memory 26. Thus, when the <KEY>.cxt files are loaded, the corresponding symbols pick up and complete the procedure definition.

Figure 10:
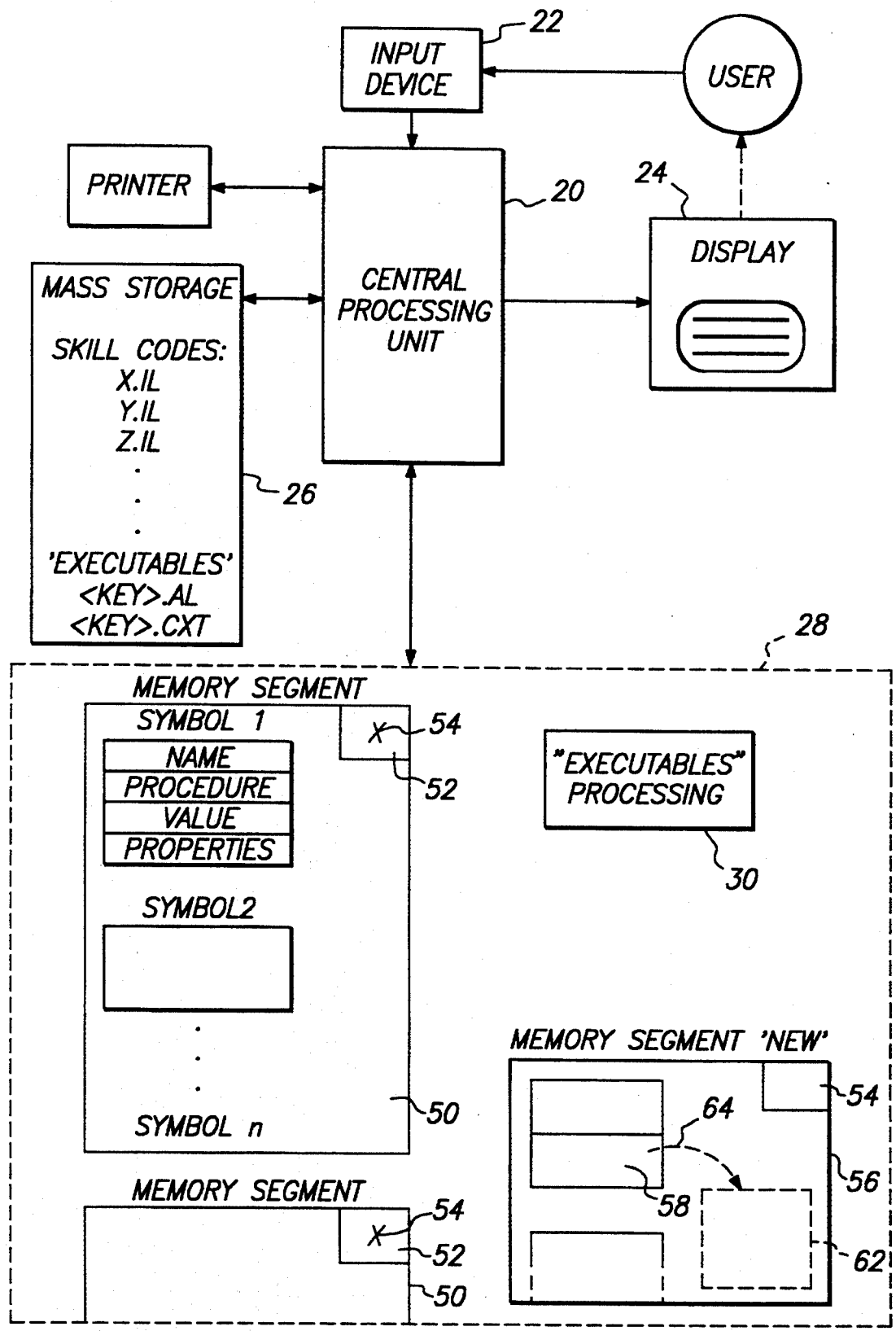
FIG. 10 is a pictorial block schematic diagram of a conventional engineering workstation configured for program integration according to the present invention.

Referring now to FIG. 10, there is shown a conventional workstation, for example, as illustrated in FIG. 9 configured for operation of the program integration process illustrated in FIGS. 1A, 1B and FIG. 2. With reference to FIG. 2, there is illustrated the primary portion of the Context-building process according to the present invention. The process starts with an initialized state 16 and is controlled by the 'executables' to run in the Context-building mode in accordance with the preprogram or script of instructions that the integrator originally creates or provides. Thus, in FIG. 2, the step 17 of "mark all currently allocated SKILL heaps 'locked'" involves segments 50 of memory 28, and in these memory segments reside the data structures including the pointers, and the values for each SKILL code in the associated symbols. Thus, marking a segment "locked" 17 constitutes setting a memory header 52 in each memory segment with a suitable marker 54 in one of the fields of that header (designated 'X' in FIG. 10) to indicate that this memory segment is locked. Thereafter, when loading 19 all SKILL code associated with a given key into new heaps, the mass storage 26 is accessed in a designated segment thereof for the SKILL codes residing therein. This requests the <X>.il files which are the actual SKILL codes that correspond to the given key at hand for which a Context is to be created. Thus, once these SKILL codes are read into main memory 28, a set of memory segments 56 will be newly generated which will not have the marker on them as illustrated in FIG. 10. This new memory segment will therefore contain all the structures and the pointers that the currently-active set of SKILL codes generated according to step 19 of FIG. 2. In accordance with the step 21 in FIG. 2, if there is a "reference from current new heaps to symbols in locked heaps" this may be represented by a segment of memory 58 in the new heap 56 that is pointing to a symbol in a memory segment 60 that is marked 'locked'. If that is the case, then at step 25 in FIG. 2, the structure of the symbol pointed to is copied 62 into the current heap 56. That is, the symbol structure 60 pointed to in the 'locked' heap will be copied 62 into the new heap 56 so the structure will be duplicated, and then all the pointers in the current heap are adjusted 27 to point 64 to the new symbol structure 62. This effectively finds the pointer that was pointing to the symbol in a locked heap in memory 28 and actually replaces it with a new pointer 64 to the new symbol structure 62 to make the new heaps independent of the old 'locked' heaps. Thereafter, at step 23 in FIG. 2, the test of whether there is a "data pointer in current heap pointing to a locked heap" should conclude that there is not, which means the new heaps are all independent of the old, 'locked' heaps. Therefore, the contents of the heaps can be written into a Context file. Thus all the memory 56 segments in the memory 28 that have been marked 'new' will be copied with their associated pointers 64 into the mass storage device 26 in a file therein labelled <KEY>.cxt that corresponds to the selected function of interest (e.g., "Spellchecker"). The <KEY>.cxt file therefore contains an analogous 'snapshot' or picture of the machine-readable zeros and ones that constitute the preprocessed or predigested (i.e. converted) Lisp-based SKILL codes in memory 28 that are saved into the mass storage device 26, and that are available to distribute to users to load quickly as a user requests.

Therefore, the present invention facilitates the dynamic loading of SKILL Contexts by obviating the need to load in at one time all of the massive code written in SKILL for particular functionalities. The invention creates incremental Contexts and loads the incremental Contexts. The creation of the incremental Contexts occurs as previously described by interpreting SKILL or LISP-based code that is loaded in one session. Also, the present invention breaks up massive code into several segments or modules that can be saved or stored in separate files so that, at the user's site, these segments or modules can be loaded independently of each other to provide the functionality that the user requests. These incremental Contexts, although broken up into the SKILL-Context separate segments, represent just one program when loaded in a session. Since there are no real boundaries, artificial boundaries are established to make segmenting possible and to facilitate loading segments at run time via keys corresponding to Contexts, and keys corresponding to functionalities, as previously described. The Context files are broken up along the boundaries of the heaps so that at load or run time, a certain set of heaps can be loaded and be operational. A new Context can then be created by first making all the currently-allocated SKILL heaps 'Locked'. Then, as the new SKILL code is loaded in, new heaps are created and any clashes associated with a new heap including a pointer to an existing locked heap are resolved.

Thus, with breaks in the program oriented along the boundaries of heaps at integration time, then a Context associated with a requested functionality can be loaded in preprocessed form ready to start execution after checking that all the procedures needed for the requested functionality are defined, and after resolving all symbol clashes that may result from similar symbols that were previously loaded. At run time, there are two passes over the memory. The first pass is to resolve all the clashes among the symbols that were just loaded, and the second pass over the memory is to update any pointer that points to an obsolete symbol that was discarded during the clash resolution.

What is claimed is:

1. In a first computer system having a processor, storage, a working memory comprising a plurality of segments, and uninterpreted code representing a plurality of functionalities, a computer implemented method for loading a pre-interpreted file into the working memory of a second computer system having a processor, storage, a working memory comprising a plurality of segments, and an executable program, said method comprising the steps of:
   defining portions of uninterpreted code in the storage of said first computer, wherein each code portion represents a functionality;
   interpreting a code portion in a first segment of working memory of said first computer, wherein the first segment comprises information necessary for independent execution of the code portion without reference to other segments of working memory;
   storing the contents of the first segment of working memory in a file in the storage of said first computer, wherein said file is associated with the functionality represented by the code portion;
   copying the file to the storage of said second computer; and
   loading the file into segment of working memory in said second computer for execution by the processor of said second computer when said functionality associated with the file is required by the executable program on said second computer.

2. The computer-implemented method of claim 1, wherein the defining step comprises the steps of:
   executing a functionality of the uninterpreted code on the processor of said first computer;
   retrieving all subportions of the uninterpreted code that represent the functionality; and
   designating the retrieved subportions of uninterpreted code as a code portion representing the executed functionality.

3. The computer-implemented method of claim 1, wherein the interpreting step comprises:
   determining whether the interpreted code portion in said first segment of working memory requires information from another segment in working memory that is necessary for independent execution of the interpreted code portion; and
   copying such necessary information from such another segment of working memory to said first segment of working memory.

4. The computer-implemented method of claim 1, wherein the interpreting step comprises the steps of:

designating selected segments of said working memory as being locked, said first segment of working memory not being designated as locked;

interpreting the code portion to generate an image which is representative of the code portion in said first segment of working memory, said image comprising a plurality of pointers to data structures in working memory; and for each of said pointers, determining whether said pointer points to a data structure residing in said locked segments, and if so, copying said data structure into said first segment and altering said pointer to point to the copied data structure residing within said first segment.

5. The computer-implemented method of claim 4, wherein the step of designating selected segments of said working memory as being locked through the step of storing the contents of the first segment of working memory in a file in the storage of said first computer are repeated to create a plurality of files, each file being associated with a functionality.

6. The computer-implemented method of claim 1, wherein the uninterpreted code comprises a plurality of functions, and the method further comprises the steps, after the storing step, of:

reading said uninterpreted code portion to determine the functions in said uninterpreted code portion;

creating a list, wherein each function in the uninterpreted code portion is associated with the file associated with the code portion;

storing said list in an autoload file associated with the file, wherein said autoload file is stored in the storage of said first computer and said second computer.

7. The computer-implemented method of claim 6, wherein the file is loaded into said segment of working memory in said second computer when a function associated with the file is referenced in the executable program.

8. The computer-implemented method of claim 6, wherein the step of interpreting an uninterpreted code portion through the step of storing said list in an autoload file are repeated to create a plurality of autoload files, each autoload file associated with a file.

9. The computer-implemented method of claim 1, wherein the information necessary for independent execution comprises a plurality of pointers and symbols and the loading step comprises the steps of:

loading the file, including the pointers and symbols, into said segment of working memory in said second computer;

updating said pointers to point to locations within said segment of working memory in said second computer;

for each symbol in said loaded file, determining whether an existing symbol residing within said working memory in said second computer has the same name as said symbol in said loaded file, and if so, designating said symbol in said loaded file as an obsolete symbol and designating the existing symbol as a current symbol;

determining whether said current symbol has a procedure definition, and whether said obsolete symbol has a procedure definition;

if said current symbol does not have a procedure definition and said obsolete symbol has a procedure definition, updating said current symbol with the procedure definition from said obsolete symbol; and for each pointer, determining whether said pointer points to an obsolete symbol, and if so, changing said pointer to point to the current symbol with the same name as the obsolete symbol.

10. The method of claim 9 wherein the updating step comprises the steps of:

determining an offset between said first segment of working memory and said segment of working memory in said second computer; and adding the offset to each pointer in the file.

11. The method of claim 9, further comprising the following step inserted before the step of determining whether said pointer points to an obsolete symbol:

determining whether said obsolete symbol has a property list, and if so, appending said property list to said current symbol.

12. The method of claim 9, further comprising the following steps inserted before the step of determining whether said pointer points to an obsolete symbol:

determining whether said obsolete symbol has a value, and whether said current symbol has a value; and if said obsolete symbol has a value and said current symbol does not have a value, updating said current symbol with the value from said obsolete symbol.

13. The computer-implemented method of claim 9, wherein the step of loading the file, including the pointers and symbols, into said segment of said working memory in said second computer through the step of determining whether said pointer points to an obsolete symbol are repeated to load a plurality of files into said working memory of said second computer.

* * * * *